Feb. 12, 1929.
E. P. BROWN
PISTON
Filed Nov. 22, 1927
1,701,489
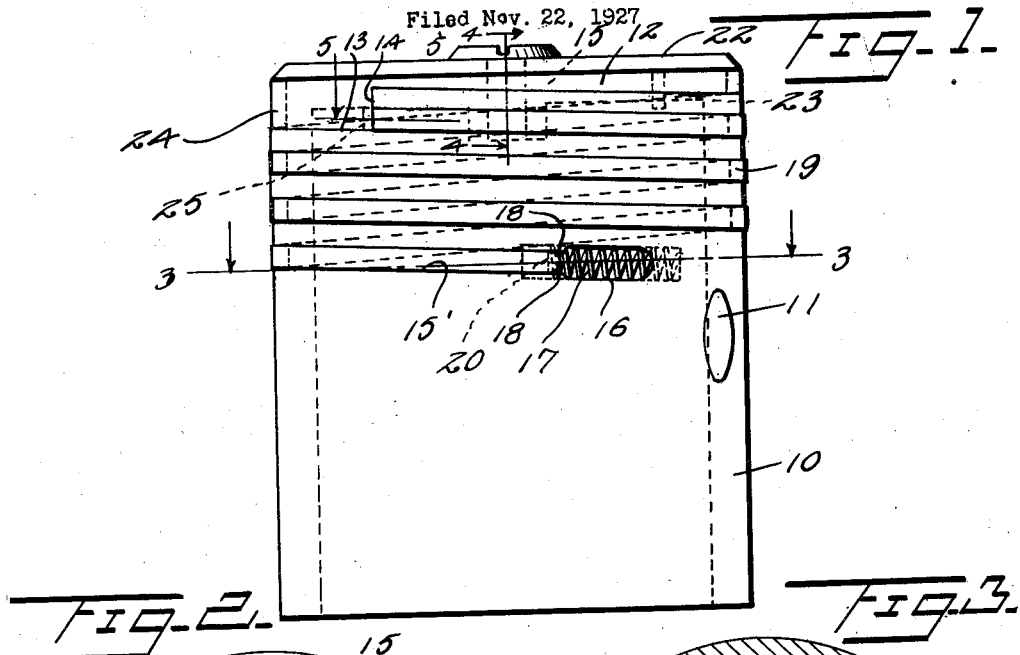
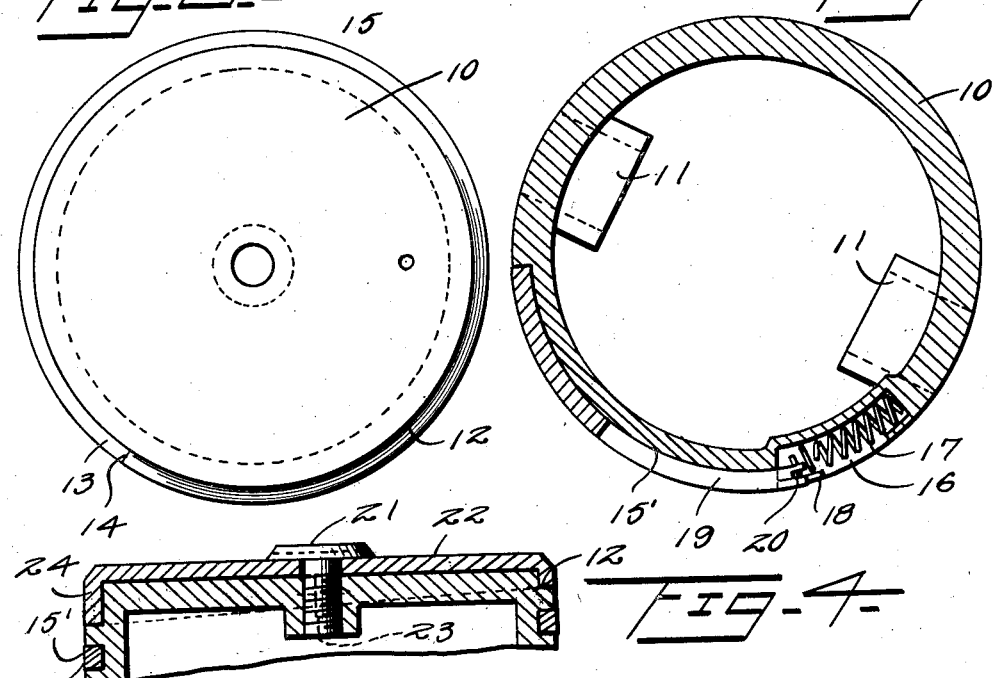
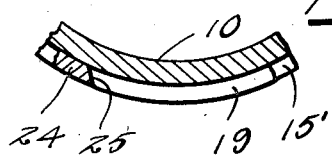
Inventor
E. P. Brown
By Watson E. Coleman
Attorney Patented Feb. 12, 1929.

1,701,489

UNITED STATES PATENT OFFICE.

EDGAR P. BROWN, OF ROY, NEW MEXICO.

PISTON.

Application filed November 22, 1927. Serial No. 235,031.

This invention relates to improvements in pistons and more particularly to the manner of packing the piston.

An important object of the invention is to provide a construction such that a spiral metallic piston ring may be conveniently employed and may be readily inserted to and removed from the groove provided in the periphery of the piston for its reception.

A further and more specific object of the invention is to provide a construction such that the piston ring may be readily applied to the piston by relative rotation of the piston and ring upon their respective axes.

A still further object of the invention is to provide a construction such that a coil spring may be employed to provide additional expansion for the piston and this coil spring will be fully protected from the excessive heat to which the upper end of the piston is subjected in use.

These and other objects I attain by the construction shown in the accompanying drawings, wherein for the purpose of illustration is shown a preferred embodiment of my invention and wherein:—

Figure 1 is a side elevation of a piston constructed in accordance with my invention;

Figure 2 is a plan view of the piston with the cap removed;

Figure 3 is a section on the line 3—3 of Figure 1;

Figure 4 is a section on the line 4—4 of Figure 1;

Figure 5 is a section on the line 5—5 of Figure 1.

Referring now more particularly to the drawings, the numeral 10 generally designates a cylindrical piston having the usual pin bosses 11. The periphery of this piston is provided with a spiral ring groove 15, the lower end of which opens into a socket 16 formed in the wall. The upper end of the piston has a rabbet 12, which is of the same depth as the ring groove and is abruptly deepened at one point to an extent equal to the pitch of the groove 15, as indicated at 14. The bottom wall 13 of this groove has the same pitch as the groove and at the point of its greatest depth aligns with the bottom of the upper coil of the groove.

The socket 16 has the end thereof remote from that into which the ring groove opens undercut or extending behind the outer wall of the piston. The socket extends in the general direction of the ring groove and is of such depth that a spiral spring 17, when disposed therein, will have the outer faces of its coils disposed inwardly of the peripheral wall, so that they will not engage against the walls of the cylinder. The ring groove is of preferably less width than the socket opening, so that at the sides of the ring groove, where it opens into the socket, overhanging walls are provided at 18 preventing the ring engaging end of the spring accidentally escaping from the socket. The ring 19 is of spiral formation and is formed in the end thereof which extends to said socket with a notch 20 in which the outer portion of the endmost coil of the spring may engage. The spring thus serves to prevent this end of the ring from bearing too hard against the surface of the piston or escaping from the groove. The upper end wall of the piston may either be solid or in the form of a spider and is provided with a cap-screw opening for the reception of a cap-screw 21.

A cap or false head is provided, as indicated at 22, which is retained in position by the cap-screw 21 against axial displacement and is held against rotation with relation to the piston by said cap-screw and a coacting dowel pin 23. This cap has a depending flange 24 which is shaped to fit the rabbet and the portion thereof which opposes the shoulder 14 is slightly undercut, as more clearly shown at 25. The corresponding end of the ring has a similar bevel, so that the coaction of the ring and shoulder opposing portion of the flange will tend to maintain the upper end of the ring against undue projection from the groove.

It will, of course, be obvious that the spring 17 will act to urge the ring longitudinally and accordingly cause the same to expand and project from the groove to maintain its contact with the cylinder. Such a ring may be very readily installed in position by simply rotating the ring upon its own axis while holding the piston stationary, after first entering the lower end of the ring in the upper end of the groove. Of course, the ring may be inserted by application as in the manner of applying the ordinary piston ring, if preferred. The spring 17, due to its location, will not be subject to the intense heat to which the upper end of the piston is subjected and will accordingly be relatively long lived.

Since the construction hereinbefore set forth is obviously capable of a certain range of change and modification without materially departing from the spirit of the invention, I do not limit myself to such specific structure except as hereinafter claimed.

I claim:—

1. In combination with a piston having in its peripheral wall a spiral groove and having in said peripheral wall at the upper end thereof a rabbet extending to such upper end and in which the groove opens, a ring within said groove, a cap for the piston having a flange fitting within the rabbet and closing the upper end of the groove, the piston having in its wall a socket into which the lower end of the groove opens, a spring disposed within such socket bearing at one end against the piston and at its opposite end against the ring, the inner end of the ring having a notch adapted for the reception of a coil of one end of the spring and means preventing outward movement of said end of the spring to thereby prevent outward movement of the ring in the groove.

2. In combination with a piston having in its peripheral wall a spiral groove and having in said peripheral wall at the upper end thereof a rabbet extending to such upper end and in which the groove opens, a ring within said groove, a cap for the piston having a flange fitting within the rabbet and closing the upper end of the groove, the piston having in its wall a socket into which the lower end of the groove opens, a spring disposed within such socket bearing at one end against the piston and at its opposite end against the ring, the inner end of the ring having a notch adapted for the reception of a coil of one end of the spring and means preventing outward movement of said end of the spring to thereby prevent outward movement of the ring in the groove, the ring and cap having coacting faces limiting the outward projection of the upper end of the ring.

In testimony whereof I hereunto affix my signature.

EDGAR P. BROWN.